United States Patent
Gorai et al.

(10) Patent No.: US 9,963,040 B2
(45) Date of Patent: May 8, 2018

(54) NON-CONTACT POWER SUPPLY SYSTEM, AND POWER TRANSMISSION DEVICE AND VEHICLE USED THEREIN

(75) Inventors: Naoki Gorai, Toyota (JP); Shinji Ichikawa, Toyota (JP); Tadashi Kondo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 441 days.

(21) Appl. No.: 14/426,771

(22) PCT Filed: Sep. 13, 2012

(86) PCT No.: PCT/JP2012/073445
§ 371 (c)(1),
(2), (4) Date: Mar. 9, 2015

(87) PCT Pub. No.: WO2014/041655
PCT Pub. Date: Mar. 20, 2014

(65) Prior Publication Data
US 2015/0239354 A1 Aug. 27, 2015

(51) Int. Cl.
*B60L 11/18* (2006.01)
*H02J 50/90* (2016.01)
(Continued)

(52) U.S. Cl.
CPC ............ *B60L 11/182* (2013.01); *B60L 3/00* (2013.01); *B60L 11/1803* (2013.01);
(Continued)

(58) Field of Classification Search
None
See application file for complete search history.

(56) References Cited

U.S. PATENT DOCUMENTS

| 7,741,734 B2 | 6/2010 | Joannopoulos et al. |
| 8,912,687 B2 * | 12/2014 | Kesler .................. B60L 11/182 307/10.1 |

(Continued)

FOREIGN PATENT DOCUMENTS

| AU | 2006269374 B2 | 1/2007 |
| AU | 2006269374 C1 | 1/2007 |

(Continued)

OTHER PUBLICATIONS

U.S. Appl. No. 14/427,547, filed Mar. 11, 2015 in the name of Shinji Ichikawa et al.
(Continued)

*Primary Examiner* — Thomas J Hiltunen
(74) *Attorney, Agent, or Firm* — Oliff PLC

(57) ABSTRACT

A non-contact power supply system supplies electric power in a non-contact manner from a power transmission device to a vehicle. The power transmission device includes an impedance adjusting unit configured to adjust an impedance between a power supply unit and a power transmission unit. A vehicle ECU assists an alignment between the power transmission unit and the power receiving unit in the parking operation based on a power transmission efficiency between the power transmission unit and the power receiving unit. A power transmission ECU, at the time of the alignment in the parking operation, controls the impedance adjusting unit based on a distance between the power transmission unit and the power receiving unit in a vertical direction (vehicle height). Accordingly, lowering of the power transmission efficiency caused by a change in an impedance along with a change in the vehicle height can be suppressed.

13 Claims, 9 Drawing Sheets

(51) Int. Cl.
  *H02J 50/40*      (2016.01)
  *H02J 50/12*      (2016.01)
  *B60L 3/00*       (2006.01)
  *H02J 5/00*       (2016.01)
  *H02J 7/02*       (2016.01)

(52) U.S. Cl.
  CPC ........ *B60L 11/1829* (2013.01); *B60L 11/1833* (2013.01); *B60L 11/1835* (2013.01); *B60L 11/1838* (2013.01); *H02J 5/005* (2013.01); *H02J 7/025* (2013.01); *H02J 50/12* (2016.02); *H02J 50/40* (2016.02); *H02J 50/90* (2016.02); *B60L 2210/10* (2013.01); *B60L 2210/30* (2013.01); *B60L 2210/40* (2013.01); *B60L 2230/00* (2013.01); *B60L 2230/16* (2013.01); *B60L 2240/62* (2013.01); *B60L 2250/10* (2013.01); *Y02T 10/7005* (2013.01); *Y02T 10/7088* (2013.01); *Y02T 10/7216* (2013.01); *Y02T 10/7241* (2013.01); *Y02T 10/7291* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/162* (2013.01); *Y02T 90/163* (2013.01)

(56) References Cited

U.S. PATENT DOCUMENTS

| | | | |
|---|---|---|---|
| 9,126,490 B2* | 9/2015 | Cook | B60L 11/182 |
| 9,350,196 B2* | 5/2016 | Uchida | H02J 7/025 |
| 9,643,504 B2* | 5/2017 | Ryu | B60L 11/182 |
| 9,761,370 B2* | 9/2017 | Wu | H01F 38/14 |
| 9,859,755 B2* | 1/2018 | Beaver | H02J 50/40 |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0206791 A1 | 8/2009 | Jung | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0244580 A1* | 9/2010 | Uchida | H02J 5/005 307/104 |
| 2010/0253152 A1 | 10/2010 | Karalis et al. | |
| 2010/0264745 A1 | 10/2010 | Karalis et al. | |
| 2010/0277121 A1* | 11/2010 | Hall | B60L 11/182 320/108 |
| 2011/0163609 A1 | 7/2011 | Wada et al. | |
| 2012/0025626 A1 | 2/2012 | Komiyama | |
| 2012/0025761 A1* | 2/2012 | Takada | H02J 5/005 320/108 |
| 2012/0149307 A1 | 6/2012 | Terada et al. | |
| 2012/0187771 A1 | 7/2012 | Kamata et al. | |
| 2012/0206098 A1* | 8/2012 | Kim | B60L 11/182 320/108 |
| 2012/0280765 A1* | 11/2012 | Kurs | B60L 11/182 333/175 |
| 2012/0306433 A1 | 12/2012 | Kim et al. | |
| 2013/0030615 A1 | 1/2013 | Ichikawa | |
| 2013/0037365 A1 | 2/2013 | Ichikawa | |
| 2013/0057207 A1 | 3/2013 | Ichikawa et al. | |
| 2013/0057208 A1 | 3/2013 | Takada et al. | |
| 2013/0063085 A1 | 3/2013 | Takada et al. | |
| 2013/0119781 A1 | 5/2013 | Takada et al. | |
| 2013/0257370 A1 | 10/2013 | Ichikawa | |
| 2013/0270925 A1* | 10/2013 | Tanaka | H02J 7/025 307/104 |
| 2013/0313893 A1* | 11/2013 | Ichikawa | H02J 17/00 307/9.1 |
| 2014/0015328 A1* | 1/2014 | Beaver | B60L 11/182 307/104 |
| 2014/0191819 A1* | 7/2014 | Suzuki | H02J 50/80 333/17.3 |
| 2014/0285030 A1* | 9/2014 | Nakamura | H02J 5/005 307/104 |
| 2015/0130294 A1* | 5/2015 | Suzuki | H02J 17/00 307/104 |
| 2015/0224883 A1* | 8/2015 | Ichikawa | B60L 11/1842 320/108 |
| 2015/0239354 A1 | 8/2015 | Gorai et al. | |
| 2015/0326028 A1* | 11/2015 | Suzuki | H02J 17/00 307/104 |
| 2016/0006263 A1* | 1/2016 | Shichino | H02J 5/005 307/104 |
| 2016/0141882 A1* | 5/2016 | Ichikawa | H02J 17/00 307/104 |
| 2016/0221441 A1* | 8/2016 | Hall | B60L 1/00 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 102300744 A | 12/2011 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2010-239769 A | 10/2010 |
| JP | 2011-142748 A | 7/2011 |
| JP | 2011-193671 A | 9/2011 |
| JP | 2011-244530 A | 12/2011 |
| JP | 2011-250555 A | 12/2011 |
| JP | 2011-259585 A | 12/2011 |
| JP | 2012-034468 A | 2/2012 |
| JP | 2012-034494 A | 2/2012 |
| JP | 2012-125112 A | 6/2012 |
| JP | 2012-135109 A | 7/2012 |
| JP | 2012-165633 A | 8/2012 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2011/093292 A1 | 8/2011 |
| WO | 2011/132272 A1 | 10/2011 |
| WO | 2012/014485 A2 | 2/2012 |

(56) References Cited

FOREIGN PATENT DOCUMENTS

| WO | 2012/111085 A1 | 8/2012 |
| WO | 2013/061440 A1 | 5/2013 |

OTHER PUBLICATIONS

Sep. 12, 2016 Office Action issued in corresponding U.S. Appl. No. 14/427,547.
Feb. 9, 2017 Notice of Allowance issued in U.S. Appl. No. 14/427,547.

* cited by examiner

NON-CONTACT POWER SUPPLY SYSTEM, AND POWER TRANSMISSION DEVICE AND VEHICLE USED THEREIN

TECHNICAL FIELD

The present invention relates to a non-contact power supply system, and a power transmission device and a vehicle used therein. More particularly, it relates to a technique for improving a power transmission efficiency in the non-contact power supply system.

BACKGROUND ART

A non-contact wireless power transmission without use of a power cord or a power transmission cable has been attracting an attention in recent years, and its application to an electric vehicle or a hybrid vehicle capable of charging an on-vehicle power storage device with use of electric power from a power supply provided outside of the vehicle (hereinafter, referred to as "external power supply") has been proposed.

In such a non-contact power supply system, it is important to appropriately align a power transmission side and a power receiving side to improve a power transmission efficiency.

Japanese Patent Laying-Open No. 2011-193671 (PTD 1) discloses a configuration of a system for supplying electric power in a non-contact manner from a power transmission device to a vehicle. In the system, when an alignment of a power receiving coil of a vehicle with a power transmission coil of a power transmission device is performed, a guidance control for the vehicle based on information from an on-vehicle camera and a guidance control for the vehicle based on a power transmission state from the power transmission device to the vehicle are used to ensure an accuracy of parking with respect to the power transmission device with a simple configuration.

CITATION LIST

Patent Document

PTD 1: Japanese Patent Laying-Open No. 2011-193671

SUMMARY OF INVENTION

Technical Problem

In a non-contact power supply system configured to transmit electric power in a non-contact manner from a power transmission device to a vehicle, the power transmission efficiency may be changed in accordance with a positional relationship between a power transmission unit of the power transmission device and a power receiving unit of the vehicle. The change in the positional relationship includes a vehicle height representing a distance between the power transmission unit and the power receiving unit in a vertical direction, and a positional displacement representing a distance between the power transmission unit and power receiving unit in a horizontal direction.

The vehicle height is changed in accordance with the number of passengers on the vehicle and a weight of luggage mounted in a trunk room. In that case, an input impedance of the power transmission unit is changed. Therefore, even when the positional relationship between the power transmission unit and the power receiving unit is in the optimum positional relationship expected at the time of designing, the transmission efficiency may be lowered as compared to the optimum state in designing. Accordingly, in order to improve the transmission efficiency, it would be necessary to perform an alignment of the vehicle and the power transmission device and an adjustment of the impedance while taking into account an actual vehicle height.

The present invention was made to solve such a problem, and its object is to suppress lowering of the power transmission efficiency along with a change in a vehicle height in a non-contact power supply system configured to transmit power in a non-contact manner from a power transmission device to a vehicle.

Solution to Problem

A non-contact power supply system according to the present invention supplies electric power in a non-contact manner from a power transmission device to a vehicle. The vehicle includes a power receiving unit configured to receive electric power in a non-contact manner from the power transmission device. The power transmission device includes a power supply unit, a power transmission unit configured to supply electric power in a non-contact manner from the power supply unit to the power receiving unit, and an impedance adjusting unit electrically connected between the power supply unit and the power transmission unit and configured to adjust an impedance between the power supply unit and the power transmission unit. The non-contact power supply system includes a detection unit configured to detect a distance between the power transmission unit and the power receiving unit in a vertical direction, and a control device configured to control the impedance adjusting unit. The control device assists an alignment between the power transmission unit and the power receiving unit during a parking operation of the vehicle with respect to the power transmission device based on a power transmission efficiency between the power transmission unit and the power receiving unit. At the time of the alignment during the parking operation, the control device controls the impedance adjusting unit based on the distance in the vertical direction detected by the detection unit.

Preferably, the control device controls the impedance adjusting unit so that, with the distance in the vertical direction, a power receiving characteristic is obtained which causes the power transmission efficiency to be lowered as a positional displacement in a horizontal direction from a predetermined position between the power transmission unit and the power receiving unit increases.

Preferably, after the alignment is completed, the control device determines an amount of the positional displacement based on the power transmission efficiency at a stopped position of the vehicle, and further adjusts the impedance adjusting unit based on the determined amount of the positional displacement.

Preferably, the detection unit is mounted on the vehicle.

Preferably, the detection unit is included in the power transmission device.

Preferably, the impedance adjusting unit includes a plurality of matching units set to have impedances different from each other. The control device selects one of the plurality of matching units in accordance with the distance in the vertical direction.

Preferably, the impedance adjusting unit includes a matching unit having a reactor and a capacitor, and at least one of the reactor and the capacitor is a variable element.

The control device adjusts an impedance by changing the variable element of the matching unit in accordance with the distance in the vertical direction.

Preferably, the vehicle further includes a power storage device configured to store power received by the power receiving unit. At the time of the alignment during the parking operation, the control device allows power, which is lower than power for charging the storage device, to be transmitted from the power transmission device to the vehicle, and gives a notification of prompting a user to stop the vehicle in response to an event that the power transmission efficiency provided in the case of using the lower power exceeds a predetermined value.

Preferably, a difference between a natural frequency of the power transmission unit and a natural frequency of the power receiving unit is less than or equal to ±10% of the natural frequency of the power transmission unit or the natural frequency of the power receiving unit.

Preferably, a coupling coefficient between the power transmission unit and the power receiving unit is less than or equal to 0.1.

Preferably, the power receiving unit receives electric power from the power transmission unit through at least one of a magnetic field, which is formed between the power receiving unit and the power transmission unit and vibrates at a certain frequency, and an electric field, which is formed between the power receiving unit and the power transmission unit and vibrates at a certain frequency.

A vehicle according to the present invention receives electric power in a non-contact manner from a power transmission device configured to adjust an impedance by means of an impedance adjusting unit. The vehicle includes a power receiving unit configured to receive electric power in a non-contact manner from a power transmission unit of the power transmission device, and a control device configured to control an alignment between the power transmission unit and the power receiving unit during a parking operation with respect to the power transmission device based on a power transmission efficiency between the power transmission unit and the power receiving unit. At the time of the alignment during the parking operation, the control device controls the impedance adjusting unit of the power transmission device based on a distance between the power transmission unit and the power receiving unit in a vertical direction.

A power transmission device according to the present invention transmits electric power in a non-contact manner to a vehicle. The power transmission device includes a power supply unit, a power transmission unit configured to supply electric power in a non-contact manner from the power supply unit to a power receiving unit of the vehicle, an impedance adjusting unit electrically connected between the power supply unit and the power transmission unit and configured to adjust an impedance between the power supply unit and the power transmission unit, and a control device configured to control the impedance adjusting unit. The vehicle performs an alignment of the power transmission unit and the power receiving unit during a parking operation with respect to the power transmission device based on a power transmission efficiency between the power transmission unit and the power receiving unit. At the time of the alignment during the parking operation, the control device controls the impedance adjusting unit based on a distance between the power transmission unit and the power receiving unit in a vertical direction.

Advantageous Effects of the Invention

According to the present invention, the impedance adjustment taking into account a vehicle height can suppress lowering of the power transmission efficiency which may occur in the non-contact power supply system due to a change in the vehicle height.

DESCRIPTION OF EMBODIMENT

Figure 1:
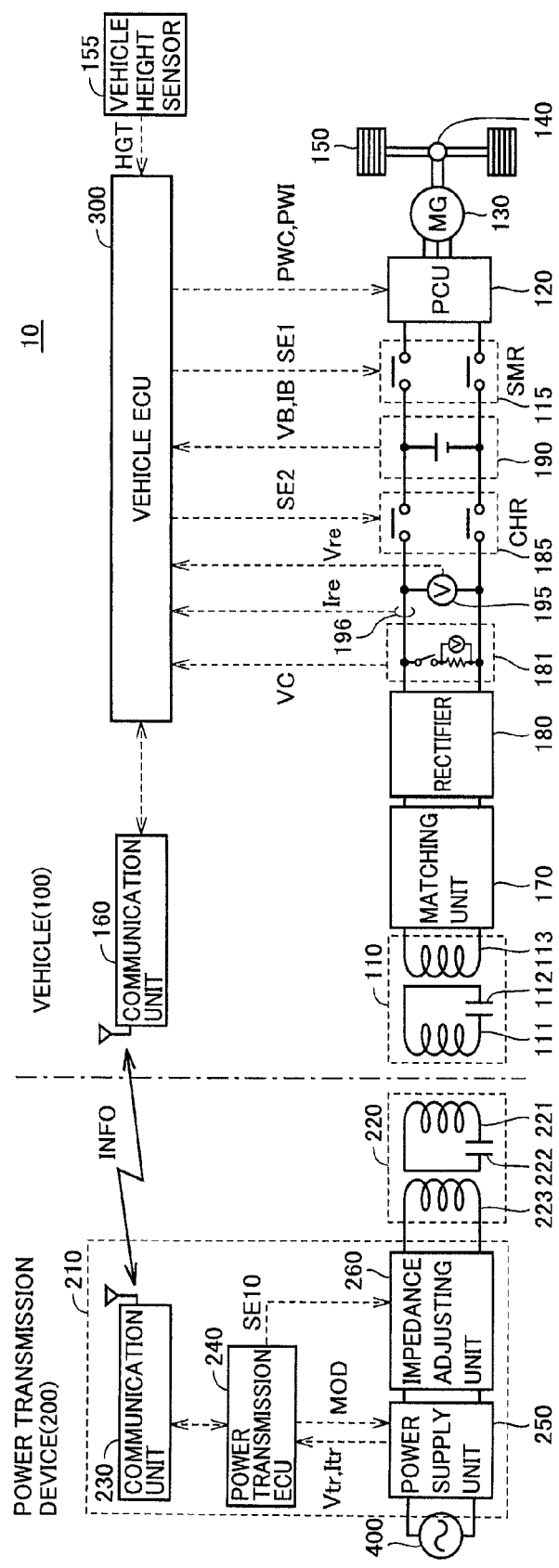
FIG. 1 represents an overall configuration of a non-contact power supply system of a vehicle according to an embodiment of the present invention.

In the following, the embodiment of the present invention will be described in detail with reference to the drawings. The same or corresponding parts in the drawings have the same reference numerals allotted, and description thereof will not be repeated.

(Configuration of Non-Contact Power Supply System)

FIG. 1 represents an overall configuration of a non-contact power supply system 10 according to the present embodiment. Referring to FIG. 1, non-contact power supply system 10 includes a vehicle 100 and a power transmission device 200.

Power transmission device 200 includes a power supply device 210 and a power transmission unit 220. Power supply device 210 generates alternate-current power having a predetermined frequency. As one example, power supply device 210 receives power from a commercial power supply 400 to generate alternate-current power having a high frequency, and supplies the generated alternate-current power to power transmission unit 220. Power transmission unit 220 outputs electric power in a non-contact manner to a power receiving unit 110 of vehicle 100 through an electromagnetic field generated around power transmission unit 220.

Power supply device 210 further includes a communication unit 230, a power transmission ECU 240 as a control device, a power supply unit 250, and an impedance adjusting unit 260. Moreover, power transmission unit 220 includes a resonance coil 221, a capacitor 222, and an electromagnetic induction coil 223.

Power supply unit 250 is controlled by a control signal MOD from power transmission ECU 240 and converts power received from an alternate-current power supply such as commercial power supply 400 into electric power having a high frequency. Power supply unit 250 supplies the converted high-frequency electric power to electromagnetic induction coil 223 through impedance adjusting unit 260.

Moreover, power supply unit 250 outputs a power transmission voltage Vtr and a power transmission current Itr, which are respectively detected by a voltage sensor and a current sensor not illustrated in the drawings, to power transmission ECU 240.

Impedance adjusting unit 260 is configured to adjust an input impedance of power transmission unit 220 and typically includes a reactor and a capacitor. Examples of a specific configuration of impedance adjusting unit 260 are shown in FIGS. 2 and 3.

Figure 2:
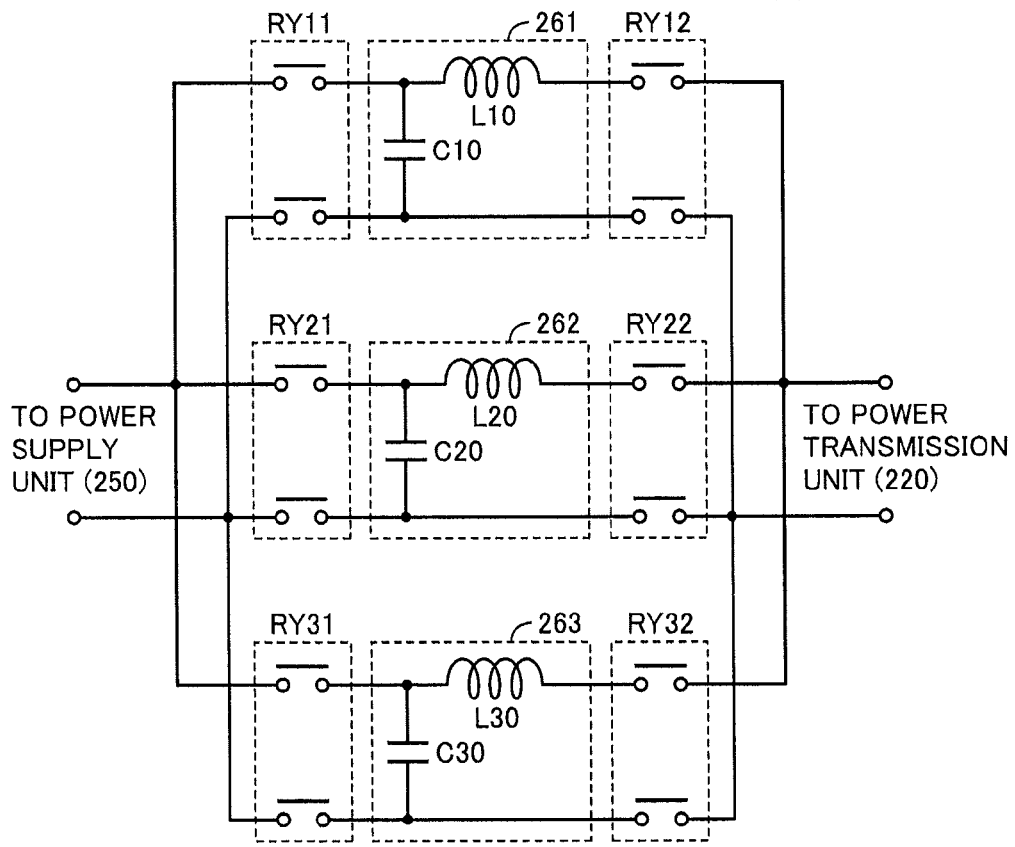
FIG. 2 represents an example of a configuration of a matching unit in FIG. 1.

For example, impedance adjusting unit 260 shown in FIG. 2 includes a plurality of matching units 261, 262, 263 set to have input/output impedances different from each other. Matching unit 261 includes a capacitor C10 and a reactor L10, and is coupled to power supply unit 250 through a relay RY11 and to power transmission unit 220 through a relay RY12. Matching unit 262 includes a capacitor C20 and a reactor L20, and is coupled to power supply unit 250 through a relay RY21 and to power transmission unit 220 through a relay RY22. Matching unit 263 includes a capacitor C30 and a reactor L30, and is coupled to power supply unit 250 through a relay RY31 and to power transmission unit 220 through a relay RY32. One of the plurality of matching units 261, 262, 263 is selected by a control signal SE10 from power transmission ECU 240, and a relay corresponding to the selected matching unit is closed.

Figure 3:
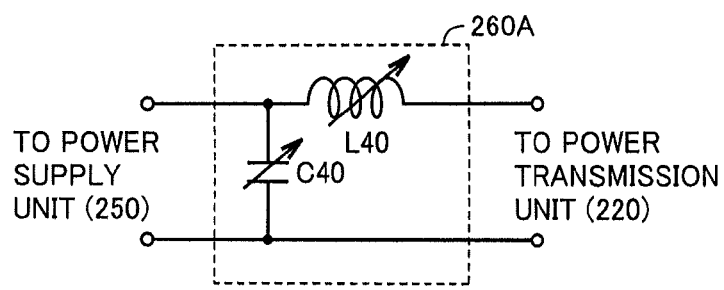
FIG. 3 represents another example of the configuration of the matching unit in FIG. 1.

The impedance adjusting unit in FIG. 3 includes a matching unit 260A configured to adjust an impedance. Matching unit 260A includes a capacitor C40 and a reactor L40, and at least one of capacitor C40 and reactor L40 is configured to be variable. Matching unit 260A changes a capacitance of capacitor C40 and/or a reactance of reactor L40 based on control signal SE10 to adjust the impedance to a desired impedance. With use of such a variable element, a simple configuration can be achieved with a less number of circuits as compared to the configuration of FIG. 2. However, when a wider variable range is required, there is a possibility that the element is increased in size or becomes expensive. Therefore, the configuration of the impedance adjusting unit is suitably set taking into consideration a required variable range, cost, and the like. The variable elements described above are not limited to those continuously changing the capacitance and reactance. The variable elements may be those changing the capacitance and the like in a stepwise manner by switching the capacitor and reactor, which are connected in series and/or parallel, with use of a changeover switch such as a relay.

Though not illustrated in the drawings, the configurations of FIGS. 2 and 3 can be combined to have a configuration of switching a plurality of variable matching units having different adjustment ranges. Using such a combined configuration, a wider adjustment range can be achieved, and a fine adjustment can be conducted. Moreover, the method for connecting the capacitor and the reactor in the matching unit is not limited to the methods shown in FIGS. 2 and 3. For example, a connection such as so-called T-type circuit or π-type circuit can be employed.

Referring back to FIG. 1, electromagnetic induction coil 223 can be magnetically coupled to resonance coil 221 through electromagnetic induction. Electromagnetic induction coil 223 transmits high-frequency power supplied from power supply unit 250 to resonance coil 221 through electromagnetic induction.

Resonance coil 221 transfers the electric power transmitted from electromagnetic induction coil 223 to resonance coil 111 included in power receiving unit 110 of vehicle 100 in a non-contact manner. Resonance coil 221 together with capacitor 222 constitute an LC resonance circuit. The power transmission between power receiving unit 110 and power transmission unit 220 will be described later with reference to FIG. 5.

Communication unit 230 is a communication interface configured to perform a wireless communication between power transmission device 200 and vehicle 100, and performs a delivery of information INFO with a communication unit 160 on a side of vehicle 100. Communication unit 230 receives vehicle information sent from communication unit 160 on the side of vehicle 100, a signal providing a command to start and stop the power transmission, and the like, and outputs the received information to power transmission ECU 240. Moreover, communication unit 230 sends information of transmission voltage Vtr, power transmission current Itr, and the like from power transmission unit ECU 240 to vehicle 100.

Power transmission ECU 240 includes a CPU (Central Processing Unit), a storage device, and an input/output buffer, none of which is illustrated in FIG. 1. Power transmission ECU 240 performs input of a control signal from each sensor or the like and output of a control signal to each device, and performs a control for each device in power supply device 210. These controls are not limited to the process executed by software and can be processed with a dedicated hardware (electronic circuit).

Vehicle 100 includes a power receiving unit 110, a matching unit 170, a rectifier 180, a voltage detection unit 181, a charging relay CHR 185, a power storage device 190, a system main relay SMR 115, a power control unit PCU (Power Control Unit) 120, a motor generator 130, a driving power transmission gear 140, a drive wheel 150, a vehicle ECU (Electronic Control Unit) 300 as a control device, a communication unit 160, a voltage sensor 195, and a current sensor 196. Power receiving unit 110 includes a resonance coil 111, a capacitor 112, and an electromagnetic induction coil 113.

In the present embodiment, an electric vehicle is described as an example of vehicle 100. However, the configuration of vehicle 100 is not limited to this as long as it is a vehicle capable of traveling with use of power stored in the power storage device. Another examples of vehicle 100 may include a hybrid vehicle provided with an engine, a fuel cell vehicle provided with a fuel cell, and the like.

Resonance coil 111 receives electric power in a non-contact manner from resonance coil 221 included in power transmission device 200. Resonance coil 111 together with capacitor 112 constitutes an LC resonance circuit.

Electromagnetic induction coil 113 can be magnetically coupled to resonance coil 111 through electromagnetic induction. This electromagnetic induction coil 113 uses the electromagnetic induction to take electric power received by resonance coil 111, and outputs the electric power to rectifier 180 through matching unit 170.

Matching unit 170 is configured to adjust an input impedance of a load which supplies electric power received by resonance coil 111. Matching unit 170 has a configuration which is similar to, for example, matching units 261, 262, 263 shown in FIG. 2.

Rectifier 180 rectifies the alternate-current power received from electromagnetic induction coil 113 through matching unit 170, and outputs the rectified direct-current power to power storage device 190. Rectifier 180 can include, for example, a diode bridge and a smoothing capacitor (neither illustrated in the drawings). As rectifier 180, so-called switching regulator can be used which performs a rectification with use of a switching control. When rectifier 180 is included in power receiving unit 110, it is preferable to employ a static rectifier such as a diode bridge to prevent an incorrect operation of the switching element due to the generated electromagnetic field.

Voltage detection unit 181 includes, for example, a switch and a resistor connected in series, and a voltage sensor connected to the resistor in parallel. When the switch is closed, voltage detection unit 181 detects a voltage VC between power lines connecting rectifier 180 and power storage device 190. This voltage detection unit 181, as will be described later, is used for performing an alignment between power transmission unit 220 and power receiving unit 110 at the time of parking vehicle 100 at a parking space of power transmission device 200.

CHR 185 is electrically connected between rectifier 180 and power storage device 190. CHR 185 is controlled by a control signal SE2 from vehicle ECU 300, and switches supplying and shutting of electric power from rectifier 180 to power storage device 190.

Power storage device 190 is a power storage component capable of charging and discharging. Power storage device 190 includes, for example, a rechargeable battery such as a lithium-ion battery, a nickel hydride battery, or a lead storage battery, a power storage element such as an electric double layer capacitor, or the like.

Power storage device 190 is connected to rectifier 180. Power storage device 190 stores electric power which is received by power receiving unit 110 and rectified by rectifier 180. Moreover, power storage device 190 is connected also to PCU 120 through SMR 115. Power storage device 190 supplies electric power for generating a vehicle driving force to PCTU 120. Further, power storage device 190 stores electric power generated by motor generator 130. An output of power storage device 190 is, for example, about 200V.

Power storage device 190 is provided with a voltage sensor and a current sensor, neither illustrated in the drawings, configured to detect a voltage VB of power storage device 190 and an inputted and outputted current IB. These detected values are outputted to vehicle ECU 300. Vehicle ECU 300 calculates a state of charge (also referred to as "SOC (State Of Charge)") of power storage device 190 based on voltage VB and current IB.

SMR 115 is electrically connected between power storage device 190 and PCU 120. SMR 115 is controlled by a control signal SE1 from vehicle ECU 300, and switches supplying and shutting of electric power between power storage device 190 and PCU 120.

PCU 120 includes a converter and an inverter, neither illustrated in the drawings. The converter is controlled by a control signal PWC from vehicle ECU 300 to convert the voltage from power storage device 190. The inverter is controlled by a control signal PWI from vehicle ECU 300 to drive motor generator 130 with use of the electric power converted by the converter.

Motor generator 130 is an alternate-current rotating machine. For example, it is a permanent magnet type synchronous motor including a rotor having a permanent magnet buried therein.

Output torque of motor generator 130 is transmitted to drive wheel 150 through driving power transmission gear 140. Vehicle 100 travels with use of this torque. Motor generator 130 can generate electric power by means of a rotating force of drive wheel 150 during a regenerative braking operation of vehicle 100. The generated electric power is converted by PCU 120 to charging power for power storage device 190.

Moreover, in a hybrid vehicle provided with an engine (not illustrated in the drawings) in addition to motor generator 130, the engine and motor generator 130 are operated cooperatively to generate a required vehicle driving force. In this case, it is also possible to charge power storage device 190 with use of the electric power generated by rotation of the engine.

Communication unit 160 is a communication interface configured to perform a wireless communication between vehicle 100 and power transmission device 200, and performs a delivery of information INFO with communication unit 230 of power transmission device 200. Information INFO outputted from communication unit 160 to power transmission device 200 includes vehicle information from vehicle ECU 300, a signal instructing starting and stopping of the power transmission, a switching command for impedance adjustment unit 260 of power transmission device 200, and the like.

Vehicle ECU 300 includes a CPU, a storage device, and an input/output buffer, none of which is illustrated in FIG. 1, and performs input of a signal from each sensor and the like and output of a control signal to each device, and performs a control of each device in vehicle 100. These controls are not limited to the process executed by software and can be processed with a dedicated hardware (electronic circuit).

Vehicle height sensor 155 is provided, for example, at a lower face of a floor panel of vehicle 100, and detects a distance between the floor panel and the ground, in other words, a distance between power receiving unit 110 and power transmission unit 220 in the vertical direction, and outputs a detected value HGT to vehicle ECU 300. The distance in the vertical direction represents a length component of a line segment connecting power receiving unit 110 and power transmission unit 220 in the vertical direction. In other words, it corresponds to the distance provided when power receiving unit 110 and power transmission unit 220 are aligned in an ideal state.

Voltage sensor 195 is connected between power lines connecting voltage detection unit 181 and CHR 185, and detects a received power voltage Vre received by power receiving unit 110. Current sensor 196 is provided at a power line connecting voltage detection unit 181 and CHR 185, and detects a received power current Ire. Detected values of received power voltage Vre and received power current Ire are sent to vehicle ECU 300 and used for a calculation of a power transmission efficiency.

Figure 10:
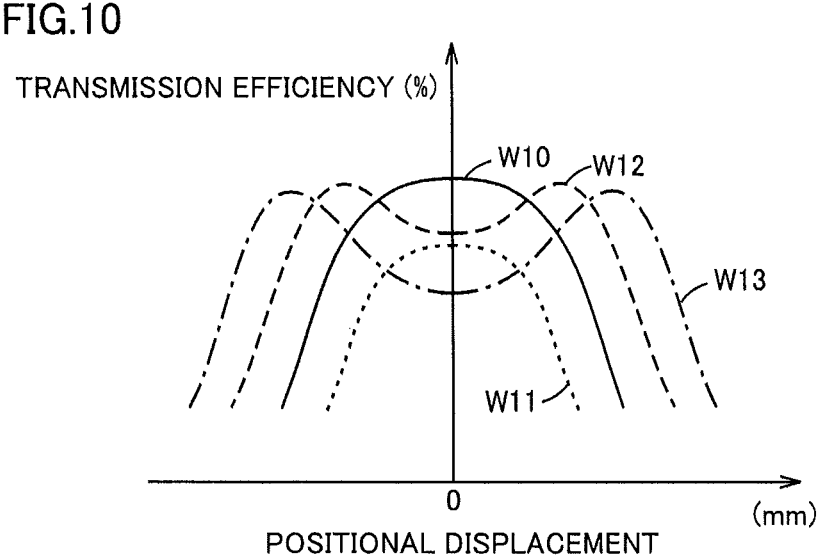
FIG. 10 is a diagram for explanation of an influence of a positional relationship between the power transmission unit and the power receiving unit with respect to the power transmission efficiency.

Moreover, at the time of the parking operation of the vehicle, vehicle ECU 300 detects a positional displacement amount of power receiving unit 110 and power transmission unit 220 in the horizontal direction based on voltage VC provided at the time of receiving electric power from power transmission device 200. More specifically, at the time of the parking operation, vehicle ECU 300 closes the relay of voltage detection unit 181 and opens CHR 185. During the parking operation, voltage detection unit 181 detects rectified direct-current voltage VC of electric power received from power transmission device 200 through power transmission with use of electric power which is lower than the power transmitted in the case of charging power storage device 190 (hereinafter, also referred to as "test power transmission"). A predetermined relationship, which will be described in detail with reference to FIG. 10, is present between the positional displacement of power transmission unit 220 and power receiving unit 110, and received power voltage VC. Therefore, the positional displacement between power transmission unit 220 and power receiving unit 110 can be determined by received power voltage VC during the parking operation.

In FIG. 1, the configuration is shown in which power receiving unit 110 and power transmission unit 220 are provided with electromagnetic induction coils 113, 223 respectively. It is also possible to have the configuration in which an electromagnetic induction coil is not provided, similarly to power receiving unit 110A and power transmission unit 220A in the non-contact power supply system 10A of FIG. 4. In this case, resonance coil 221A is connected to power supply unit 250 in power transmission unit 220A, and resonance coil 111A is connected to rectifier 180 in power receiving unit 110A.

Figure 4:
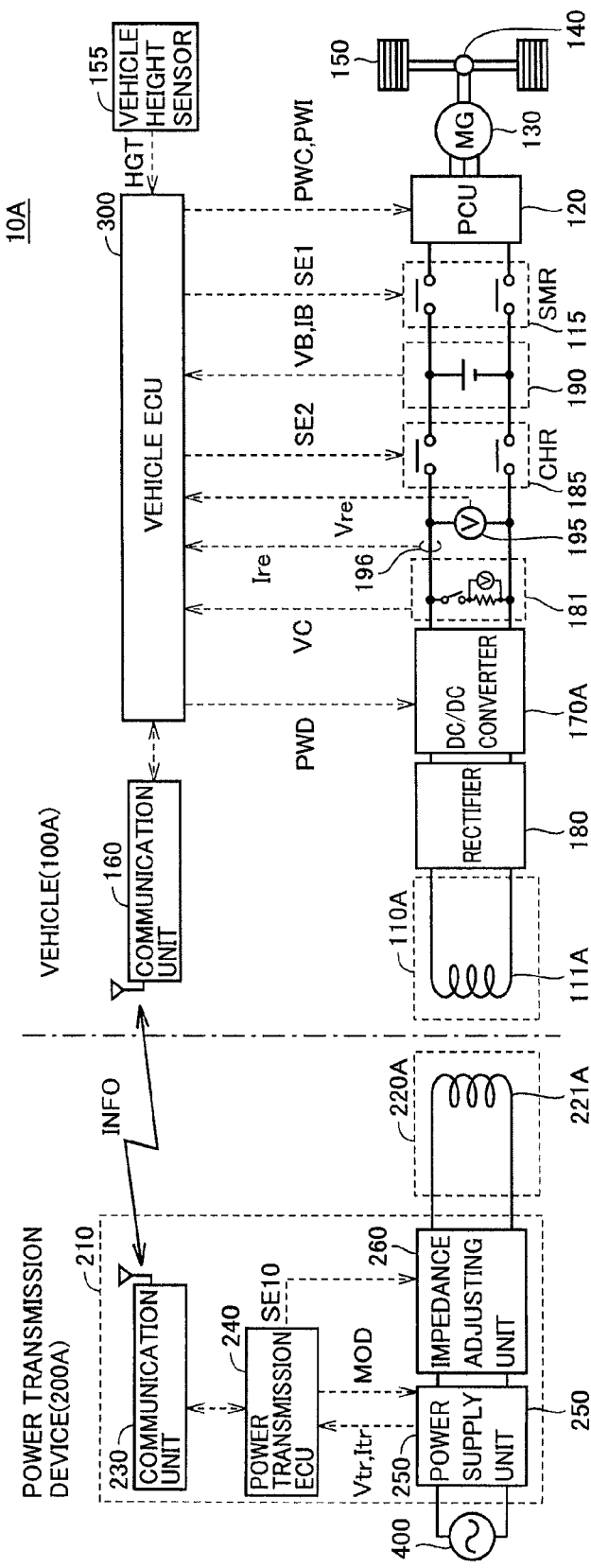
FIG. 4 represents an overall configuration of another example of the non-contact power supply system of the vehicle according to the embodiment of the present invention.

Moreover, as means for adjusting the impedance in a vehicle, DC/DC converter 170A configured to perform a voltage conversion of the direct-current voltage rectified by rectifier 180 may be provided in place of matching unit 170, as shown in FIG. 4. Alternatively, matching unit 170 and DC/DC converter 170A may be used together.

(Principle of Power Transmission)

Figure 5:
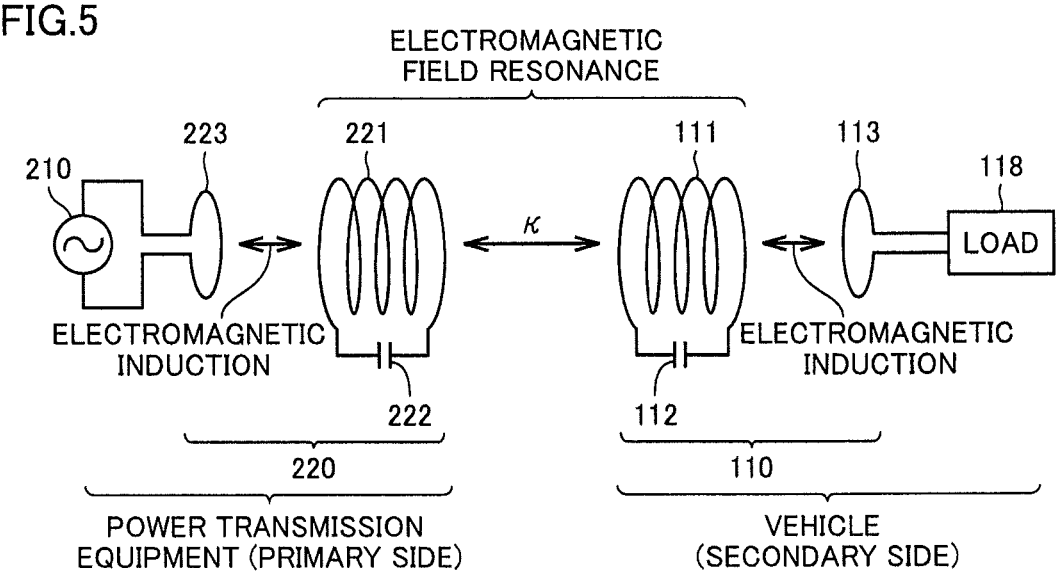
FIG. 5 represents an equivalent circuit provided at the time of power transmission from a power transmission device to a vehicle.

FIG. 5 represents an equivalent circuit provided at the time of the power transmission from power transmission device 200 to vehicle 100. Referring to FIG. 5, power transmission unit 220 of power transmission device 200 includes resonance coil 221, capacitor 222, and electromagnetic induction coil 223.

Electromagnetic induction coil 223 is provided, for example, substantially coaxially with resonance coil 221 while being spaced apart a predetermined distance from resonance coil 221. Electromagnetic induction coil 223 is magnetically coupled to resonance coil 221 through electromagnetic induction, and supplies high-frequency power, which is supplied from power supply device 210, to resonance coil 221 through electromagnetic induction.

Resonance coil 221 together with capacitor 222 forms an LC resonance circuit. As will be described later, the LC resonance circuit is formed also at power receiving unit 110 of vehicle 100. A difference between a natural frequency of the LC resonance circuit formed by resonance coil 221 and capacitor 222 and a natural frequency of the LC resonance circuit of power receiving unit 110 is less than or equal to ±10% of the former natural frequency or the latter natural frequency. Resonance coil 221 receives electric power from electromagnetic induction coil 223 through electromagnetic induction, and transmits electric power in a non-contact manner to power receiving unit 110 of vehicle 100.

Electromagnetic induction coil 223 is provided to facilitate a supply of electric power from power supply device 210 to resonance coil 221. Power supply device 210 may be directly connected to resonance coil 221 without providing electromagnetic induction coil 223. Moreover, capacitor 222 is provided to adjust the natural frequency of the resonance circuit. The configuration of not providing capacitor 222 may be employed when a desired natural frequency can be obtained with use of the stray capacitance of resonance coil 221.

Power receiving unit 110 of vehicle 100 includes resonance coil 111, capacitor 112, and electromagnetic induction coil 113. Resonance coil 111 together with capacitor 112 forms an LC resonance circuit. As described above, the difference between the natural frequency of the LC resonance circuit formed by resonance coil 111 and capacitor 112 and the natural frequency of the LC resonance circuit formed by resonance coil 221 and capacitor 222 in power transmission unit 220 of power transmission device 200 is within ±10% of the former natural frequency or the latter natural frequency. Resonance coil 111 receives electric power in a non-contact manner from power transmission unit 220 of power transmission device 200.

Electromagnetic induction coil 113 is spaced apart a predetermined distance from resonance coil 111 and is provided, for example, substantially coaxially with resonance coil 111. Electromagnetic induction coil 113 is magnetically coupled to resonance coil 111 through electromagnetic induction, and takes electric power received by resonance coil 111 through electromagnetic induction and outputs the electric power to an electrical load device 118. Electrical load device 118 is electrical equipment using electric power received by power receiving unit 110. Specifically, it inclusively represents rectifier 180 (FIG. 1) and subsequent electrical equipment.

Electromagnetic induction coil 113 is provided to facilitate electric power to be taken from resonance coil 111. Rectifier 180 may be directly connected to resonance coil 111 without providing electromagnetic induction coil 113. Moreover, capacitor 112 is provided to adjust the natural frequency of the resonance circuit. The configuration of not providing capacitor 112 may be employed when a desired natural frequency can be obtained with use of a stray capacitance of resonance coil 111.

In power transmission device 200, alternate-current power having a high frequency is supplied from power supply device 210 to electromagnetic induction coil 223, and the power is supplied to resonance coil 221 with use of electromagnetic induction coil 223. In that case, energy (electric power) moves from resonance coil 221 to resonance coil 111 through a magnetic field formed between resonance coil 221 and resonance coil 111 of vehicle 100. The energy (electric power) moved to resonance coil 111 is taken with use of electromagnetic induction coil 113 and transmitted to electrical load device 118 of vehicle 100.

As described above, in this power transmission system, the difference between the natural frequency of power transmission unit 220 of power transmission device 200 and the natural frequency of power receiving unit 110 of vehicle 100 is less than or equal to ±10% of the natural frequency of power transmission unit 220 or the natural frequency of power receiving unit 110. Setting the natural frequencies of power transmission unit 220 and power receiving unit 110 to be within such a range can improve the power transmission efficiency. On the other hand, when the difference in the natural frequencies described above is greater than ±10%, the power transmission efficiency becomes less than 10%, and negative effects such as extension of the power transmission time may occur.

The natural frequency of power transmission unit 220 (power receiving unit 110) represents a vibration frequency provided in the case where the electrical circuit (resonance circuit) constituting power transmission unit 220 (power receiving unit 110) vibrates. In the electrical circuit (resonance circuit) constituting power transmission unit 220 (power receiving unit 110), the natural frequency provided when the braking force or electric resistance is substantially zero is also referred to as the resonance frequency of power transmission unit 220 (power receiving unit 110).

Figure 6:
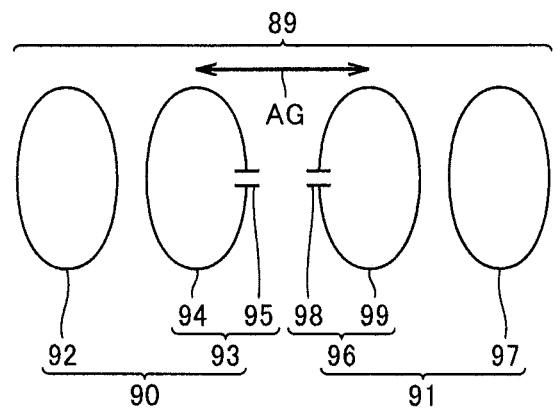
FIG. 6 represents a simulation model of the power transmission system.
Figure 7:
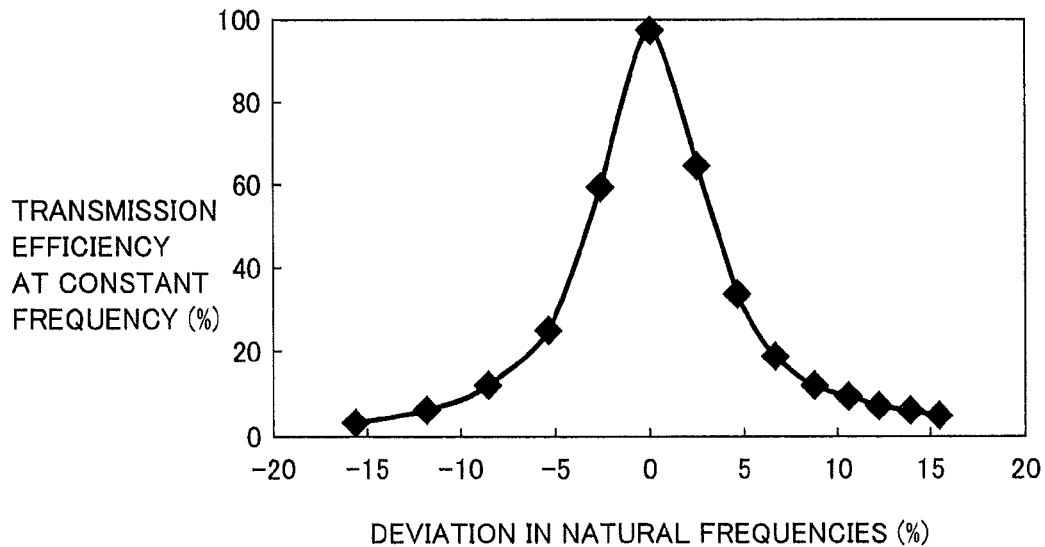
FIG. 7 represents a relationship between a deviation in natural frequencies of the power transmission unit and power receiving unit, and the power transmission efficiency.

Referring to FIGS. 6 and 7, a simulation result of an analysis for the relationship between the difference in natural frequencies and the power transmission efficiency will be described. FIG. 6 represents a simulation model of the power transmission system. Moreover, FIG. 7 represents a relationship between the deviation in the natural frequencies of the power transmission unit and the power receiving unit, and the power transmission efficiency.

Referring to FIG. 6, a power transmission system 89 includes a power transmission unit 90 and a power receiving unit 91. Power transmission unit 90 includes a first coil 92 and a second coil 93. Second coil 93 includes a resonance coil 94 and a capacitor 95 provided at resonance coil 94. Power receiving unit 91 includes a third coil 96 and a fourth coil 97. Third coil 96 includes a resonance coil 99 and a capacitor 98 connected to this resonance coil 99.

An inductance of resonance coil 94 is represented by an inductance Lt, and a capacitance of capacitor 95 is represented by a capacitance C1. Moreover, an inductance of resonance coil 99 is represented by an inductance Lr, and a capacitance of capacitor 98 is represented by a capacitance C2. Setting each parameter in such a manner, a natural frequency f1 of second coil 93 is expressed by the following formula (1), and a natural frequency f2 of third coil 96 is expressed by the following formula (2).

$$f1 = 1/\{2\pi(Lt \times C1)^{1/2}\} \quad (1)$$

$$f2 = 1/\{2\pi(Lr \times C2)^{1/2}\} \quad (2)$$

In the case where inductance Lr and capacitances C1, C2 are fixed, and only inductance Lt is changed, the relationship between the deviation in the natural frequencies of second coil 93 and third coil 96 and the power transmission efficiency is shown in FIG. 7. In this simulation, the relative positional relationship between resonance coil 94 and resonance coil 99 is fixed, and a frequency of a current supplied to second coil 93 is constant.

In the graph shown in FIG. 7, the horizontal axis represents the deviation (%) of the natural frequencies, and the vertical axis represents the power transmission efficiency (%) in the current of the constant frequency. The deviation (%) in the natural frequencies is expressed by the following formula (3).

$$(\text{deviation in natural frequencies}) = \{(f1-f2)/f2\} \times 100(\%) \quad (3)$$

As is apparent from FIG. 7, when the deviation (%) of the natural frequencies is 0%, the power transmission efficiency is close to 100%. When the deviation (%) of the natural frequencies is within ±5%, the power transmission efficiency is about 40%. When the deviation (%) of the natural frequencies is within ±10%, the power transmission efficiency is about 10%. When the deviation (%) of the natural frequencies is within ±15%, the power transmission efficiency is about 5%. In other words, setting the natural frequencies of second coil 93 and third coil 96 so that an absolute value of the deviation (%) of the natural frequencies (the difference in the natural frequencies) falls within a range of less than or equal to 10% of the natural frequency of third coil 96 can improve the power transmission efficiency to a practical level. Further, it is more preferable to set the natural frequencies of second coil 93 and third coil 96 so that an absolute value of the deviation (%) of the natural frequencies becomes less than or equal to 5% of the natural frequency of third coil 96 since it can further improve the power transmission efficiency. As the simulation software, an electromagnetic field analyzing software (JMAG (registered trademark) produced by JSOL Corporation) is employed.

Referring back to FIG. 5, power transmission unit 220 of power transmission device 200 and power receiving unit 110 of vehicle 100 transfer electric power in a non-contact manner through at least one of a magnetic field formed between power transmission unit 220 and power receiving unit 110 and vibrating at a certain frequency, and an electric field formed between power transmission unit 220 and power receiving unit 110 and vibrating at a certain frequency. A coupling coefficient κ between power transmission unit 220 and power receiving unit 110 is preferably less than or equal to 0.1, and resonating power transmission unit 220 and power receiving unit 110 by means of an electromagnetic field allows electric power to be transmitted from power transmission unit 220 to power receiving unit 110.

The magnetic field having a certain frequency formed around power transmission unit 220 will be described. The "magnetic field having a certain frequency" typically has a relation with the power transmission efficiency and the frequency of the current supplied to power transmission unit 220. Therefore, a relationship between the power transmission efficiency and the frequency of the current supplied to power transmission unit 220 will be described firstly. The power transmission efficiency provided at the time of transmitting electric power from power transmission unit 220 to power receiving unit 110 is changed by various factors such as a distance between power transmission unit 220 and power receiving unit 110. For example, the natural frequency (resonance frequency) of power transmission unit 220 and receiving unit 110 is denoted as f0, and a frequency of a current supplied to power transmission unit 220 is denoted as f3, and an air gap between power transmission unit 220 and power receiving unit 110 is denoted as an air gap AG.

Figure 8:
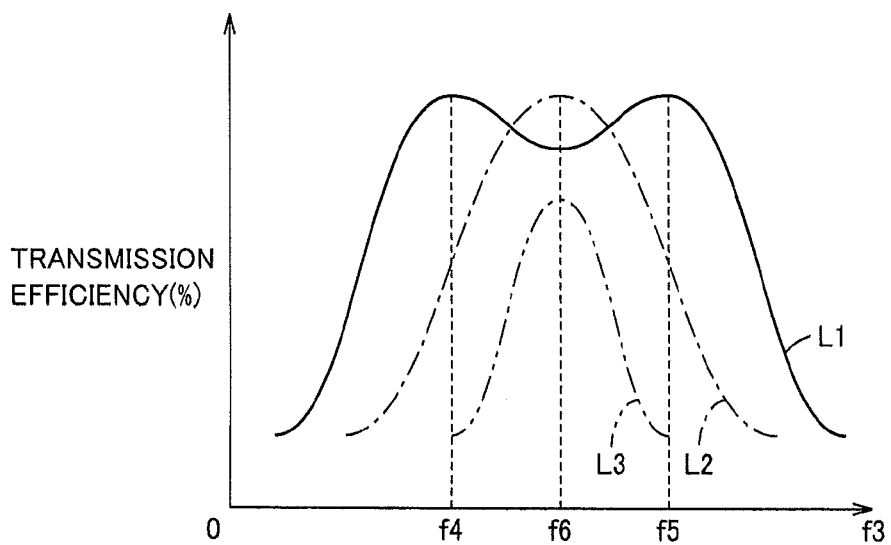
FIG. 8 is a graph representing a relationship between a power transmission efficiency provided at the time of changing an air gap in a state where the natural frequencies are fixed and a frequency of a current supplied to the power transmission unit.

FIG. 8 is a graph representing a relationship between the power transmission efficiency provided at the time of changing air gap AG in a state where natural frequency f0 is fixed and frequency f3 of a current supplied to power transmission unit 220. Referring to FIG. 8, the horizontal axis denotes frequency f3 of the current supplied to power transmission unit 220, and the vertical axis denotes a power transmission efficiency (%). An efficiency line L1 schematically represents a relationship between the power transmission efficiency with a small air gap AG and frequency f3 of the current supplied to power transmission unit 220. As indicated by efficiency line L1, when air gap AG is small, peaks of the power transmission efficiency occur at frequencies f4, f5 (f4<f5). When air gap AG is set to be large, the two peaks provided at the time of having a high power transmission efficiency are changed so as to come closer to each other. As indicated by an efficiency line L2, when air gap AG is set to be larger than a predetermined distance, one peak of the power transmission efficiency is provided. Therefore, the peak of the power transmission efficiency is provided when the frequency of the current supplied to power transmission unit 220 is at frequency f6. When air gap AG is set to be yet larger than the state of efficiency line L2, the peak of the power transmission efficiency becomes small as indicated by an efficiency line L3.

For example, the following method can be considered as a method for improving the power transmission efficiency. As the first method, it can be considered to fix the frequency of a current supplied to power transmission unit 220 in conformity with air gap AG, and change the capacitances of capacitor 222 and capacitor 112, to thereby change the characteristic of the power transmission efficiency between power transmission unit 220 and power receiving unit 110. Specifically, the capacitances of capacitor 222 and capacitor 112 are adjusted so that the power transmission efficiency reaches the peak in the state where the frequency of the current supplied to power transmission unit 220 is fixed. In this method, the frequency of the current flowing to power transmission unit 220 and power receiving unit 110 is constant regardless of the size of air gap AG.

Moreover, as the second method, the frequency of the current supplied to power transmission unit 220 is adjusted based on the size of air gap AG. For example, in the case where the power transmission characteristic takes efficiency line L1, the current having frequency f4 or f5 is supplied to power transmission unit 220. In the case where the frequency characteristic takes efficiency lines L2, L3, the current having frequency f6 is supplied to power transmission unit 220. In this case, the frequency of the current flowing to power transmission unit 220 and power receiving unit 110 is changed in accordance with the size of air gap AG.

In the first method, the frequency of the current flowing in power transmission unit 220 takes a fixed and constant frequency. In the second method, the frequency in power transmission unit 220 takes a frequency which is changed suitably in accordance with air gap AG. With the first method or second method, the current having a certain frequency set so as to raise the power transmission efficiency is supplied to power transmission unit 220. With the current of a certain frequency flowing into power transmission unit 220, a magnetic field (electromagnetic field) vibrating at a certain frequency is formed around power transmission unit 220. Power receiving unit 110 receives electric power from power transmission unit 220 through a magnetic field formed between power receiving unit 110 and power transmission unit 220 and vibrating at a certain frequency. Thus, the "magnetic field vibrating at a certain frequency" is not always limited to a magnetic field having a fixed frequency. In the example described above, the frequency of the current supplied to power transmission unit 220 is set while focusing on air gap AG. However, since the power transmission efficiency may also be changed by other factors such as a displacement of power transmission unit 220 and power receiving unit 110 in the horizontal direction, there is a case where the frequency of the current supplied to power transmission unit 220 is adjusted based on other factors.

In the description above, the example of employing a helical coil as a resonance coil is described. However, in the case where an antenna such as a meander line is employed as a resonance coil, the current having a certain frequency flows into power transmission unit 220, so that an electric field of a certain frequency is formed around power transmission unit 220. Then, through this electric field, the power transmission is performed between power transmission unit 220 and power receiving unit 110.

In this power transmission system, an improvement in the power transmission and power receiving efficiency is attempted by utilizing a near field (evanescent field) in which a "static electromagnetic field" of the electromagnetic field is dominant.

Figure 9:
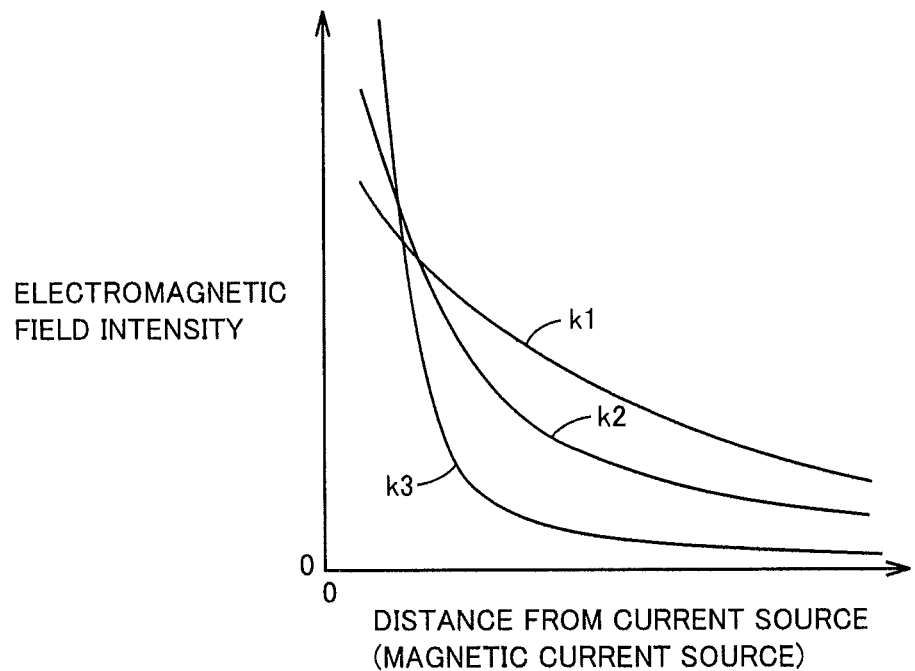
FIG. 9 represents a relationship between a distance from a current source (magnetic current source) and an intensity of an electromagnetic field.

FIG. 9 represents a relationship between a distance from a current source (magnetic current source) and an intensity of an electromagnetic field. Referring to FIG. 9, the electromagnetic field includes three components. A line k1 is a component which is in inverse proportion to a distance from a wave source, and it is referred to as a "radiant electromagnetic field." A line k2 is a component which is in inverse proportion to a square of a distance from a wave source, and it is referred to as an "induction electromagnetic field". Moreover, a line k3 is a component which is in inverse proportion to a cube of a distance from a wave source, and it is referred to as "static electromagnetic field". When the wavelength of the electromagnetic field is represented by "λ", the distance at which the intensities of "radiant electromagnetic field", "induction electromagnetic field", and "static electromagnetic field" are equal can be expressed by $\lambda/2\pi$.

The "static electromagnetic field" is a region in which the intensity of the electromagnetic wave drastically drops with the distance from the wave source. In the power transmission system according to this embodiment, a transmission of energy (power) is performed by utilizing a near field (evanescent field) in which this "static electromagnetic field" is dominant. In other words, in the near field where the "static electromagnetic field" is dominant, power transmission unit 220 and power receiving unit 110 (for example, a pair of LC resonance coils) having the natural frequencies close to each other are resonated to transmit energy (electric power) from power transmission unit 220 to other power receiving unit 110. Since this "static electromagnetic field" does not propagate energy to a distant location, the resonance method can transmit power with a less energy loss as compared to the electromagnetic wave transmitting energy (electric power) by propagating energy with a "radiant electromagnetic field."

As described above, in this power transmission system, electric power is transmitted in a non-contact manner between power transmission unit 220 and power receiving unit 110 by resonating power transmission unit 220 and power receiving unit 110 with an electromagnetic field. A coupling coefficient (κ) between power transmission unit 220 and power receiving unit 110 is, for example, preferably less than or equal to 0.3, and more preferably less than or equal to 0.1. As a matter of course, the range of coupling coefficient (κ) between about 0.1 to 0.3 can also be employed. Coupling coefficient (κ) is not limited to such a value, and may take various values achieving good power transmission.

The above-described coupling between power transmission unit 220 and power receiving unit 110 in the power transmission is referred to as, for example, "magnetic resonance coupling", "magnetic field resonance coupling," "electromagnetic field resonance coupling", "electric field resonance coupling", and the like. The "electromagnetic field resonance coupling" means coupling including all of the "magnetic resonance coupling", "magnetic field resonance coupling", and "electric field resonance coupling".

In the case where power transmission unit 220 and power receiving unit 110 are formed by coils as described above, power transmission unit 220 and power receiving unit 110 are coupled mainly by the magnetic field, so that "magnetic resonance coupling" or "magnetic field resonance coupling" is formed. It is also possible to employ an antenna such as a meander line for power transmission unit 220 and power receiving unit 110. In this case, power transmission unit 220 and power receiving unit 110 are coupled mainly by an electric field, so that "electric field resonance coupling" is formed.

(Impedance Adjustment Control)

In the non-contact power supply system as described above, it is preferable to ideally match the impedances between the power transmission unit and the power receiving unit to improve the power transmission efficiency. Generally, at the time of designing, the impedances of the power transmission unit and the power receiving unit are set so that the power transmission efficiency becomes maximum in the state where the positional relationship between the power transmission unit and the power receiving unit (the distance in the vertical direction and the horizontal direction) are in the ideal positional relationship.

In the case where a positional displacement between the power transmission unit and the power receiving unit in the horizontal direction occurs during the parking operation, or in the case where the height of the power receiving unit on the vehicle side (in other words, the vehicle height) is changed due to the number of passengers or the weight of luggage, the distance between the power transmission unit and the power receiving unit is deviated from the ideal state provided at the time of designing, so that lowering of the power transmission efficiency may occur.

However, it is very difficult for a user to stop the vehicle at the ideal position in design during the parking operation, and the number of passengers and the weight of a load may change, the finally stopped position of a vehicle may be in a state where quite a few positional displacement from the optimum position occurs.

Therefore, in the present embodiment, a guidance of a parking position is performed for a user so that parking at a position as ideal as possible can be performed during the parking operation, and the impedance control of improving the power transmission efficiency as much as possible for the final parking position after the parking operation is executed.

FIG. 10 is a diagram for explanation of an influence of the positional relationship between the power transmission unit and the power receiving unit (a positional displacement in the vehicle height and the horizontal direction) with respect to the power transmission efficiency. In FIG. 10, the horizontal axis denotes the amount of the positional displacement between the power transmission unit and the power receiving unit in the horizontal direction, and the vertical axis denotes the power transmission efficiency. As to the amount of the positional displacement, the positional displacement in the backward direction of the vehicle is indicated by a negative value when, for example, a positive value indicates the case where the position of the power receiving unit with respect to the position of the power transmission unit is displaced in the forward direction of the vehicle. Moreover, the positional displacement in the leftward direction with respect to the forward direction is indicated by a negative value when a positive value indicates the case where the position of the power receiving unit with respect to the position of the power transmission unit is displaced in the rightward direction with respect to the forward direction of the vehicle.

Referring to FIG. 10, a line W10 in FIG. 10 represents a change in the power transmission efficiency in the case where the power transmission unit and the power receiving unit are in the ideal positional relationship in design. In this case, a single peak characteristic with one peak is provided, where the power transmission efficiency becomes maximum when the amount of a positional displacement is zero, and the power transmission efficiency is lowered gradually as the amount of a positional displacement becomes greater.

When the distance between the power transmission unit and the power receiving unit in the vertical direction (vehicle height) becomes larger than the ideal state, an electromagnetic field generated between the power transmission unit and the power receiving unit is weakened. Therefore, as with a line W11 in FIG. 10, the overall power transmission efficiency is lowered in the state where the single peak characteristic is provided.

On the other hand, when the vehicle height becomes lower than the ideal state, the electric power (reflection power) which are reflected by the power receiving unit and cannot be transferred to the power receiving unit among the transmitted power increases gradually due to the changes in the impedance between the power transmission unit and the power receiving unit. Therefore, as indicated by lines W12, W13 in FIG. 10, as the distance between the power transmission unit and the power receiving unit in the vertical direction becomes smaller due to a small vehicle height, the power transmission efficiency in the case where the amount of positional displacement is zero is lowered, so that the double peak characteristic is provided, where peaks of the power transmission efficiency occur at positions displaced from the position in the ideal state.

In such a state where the double peak characteristic is provided, it is not always easy to determine with the power transmission efficiency the amount of positional displacement between the power transmission unit and the power receiving unit during the parking operation. Further, in the case where the parking operation is performed in accordance with the power transmission efficiency having the double peak characteristic, when the vehicle height is increased by a passenger getting off or taking out a luggage after the parking, the characteristics of the power transmission efficiency comes closer to the single peak characteristic. Thus, the power transmission efficiency may be deteriorated on the contrary due to the effect of the positional displacement. Therefore, in the case of performing a guidance for the parking position based on the power transmission efficiency, it would be necessary to render the characteristic of the power transmission efficiency to have the single peak characteristic.

In the present embodiment, the impedance on the side of the power transmission device is adjusted in accordance with the vehicle height so that the characteristic of the power transmission efficiency attains the single peak characteristic prior to starting of the parking operation or during the parking operation in the guidance of the parking position for the user during the parking operation. Accordingly, the alignment between the power transmission unit and the power receiving unit by the user during the parking operation can be readily performed.

The power transmission efficiency is expressed by a ratio of the received power in the power receiving unit with respect to the transmitted power from the power transmission unit. Therefore, when the impedance of the load is constant, the power transmission efficiency can be expressed as a received power voltage on the power receiving side. Thus, the power transmission efficiency can be evaluated by detecting a rectified received power voltage VC during the parking operation at voltage detection unit 181 in FIG. 1.

Moreover, in the present embodiment, after the parking operation is completed, the final amount of a positional displacement in the horizontal direction between the power transmission unit and the power receiving unit is determined from the power transmission efficiency, and the impedance on the side of the power transmission device is further adjusted so that the power transmission efficiency of the double peak characteristic is attained which makes the power transmission efficiency to be high at that amount of the positional displacement. Accordingly, the power transmission efficiency can be further improved.

Figure 11:
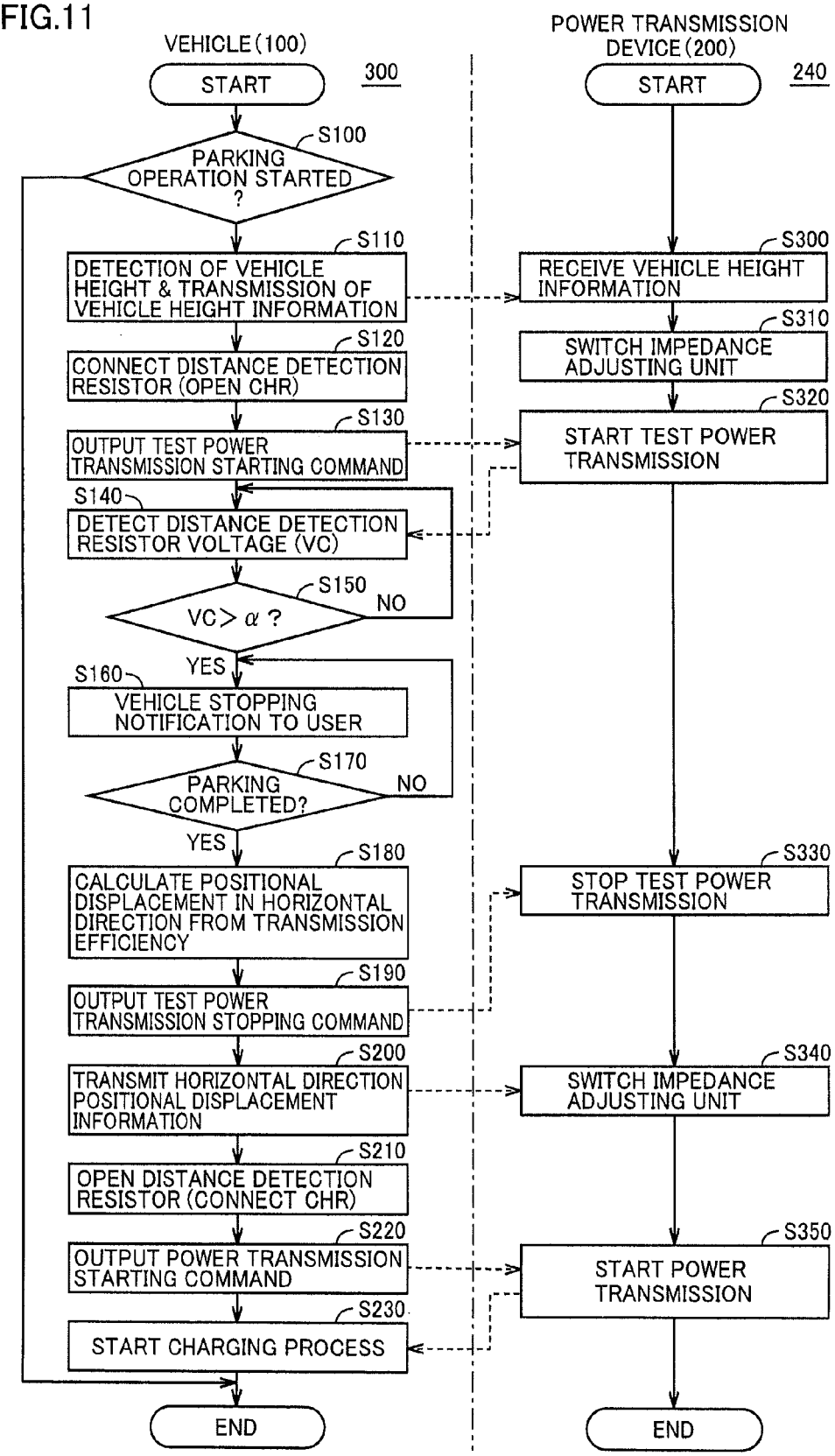
FIG. 11 is a flowchart for explanation of an impedance adjustment control process executed during a parking operation in the present embodiment.

FIG. 11 is a flowchart for explanation of the impedance adjustment control process executed during the parking operation in the present embodiment. In FIG. 11, the process executed by vehicle ECU 300 on the side of vehicle 100 and the process executed by power transmission ECU 240 on the side of power transmission device 200 are shown. Each of the steps in the flowchart shown in FIG. 11 is achieved by calling from a main routine a program stored in advance in vehicle ECU 300 and power transmission ECU 240 and executing the program at a given cycle or in response to an event that a predetermined condition is met. Alternatively, for some steps, the process can also be achieved by constructing a dedicated hardware (electronic circuit).

Referring to FIGS. 1 and 11, vehicle ECU 300 determines in Step (hereinafter, the step is abbreviated to "S") 100 whether or not the parking operation with respect to power transmission device 200 is started for charging in a non-contact manner. The determination of starting of the parking operation includes not only the case where the vehicle is actually moved to the parking space of power transmission device 200 but also the case where setting by a control switch or the like is performed so as to allow the user to perform the parking operation in the state where the vehicle is stopped.

In the case where the parking operation is not started (NO in S100), the impedance control is not required. Therefore, vehicle ECU 300 terminates the process.

In the case where the parking operation is started (NO in S100), the process proceeds to S110, and vehicle ECU 300 detects information HGT indicating the vehicle height from vehicle height sensor 155, and transmits the detected vehicle height information to power transmission device 200 through a wireless communication.

Power transmission ECU 240 receives the vehicle height information from vehicle 100 (S300), and executes the impedance adjustment so that the power transmission efficiency has the single peak characteristic in accordance with the vehicle height (S310).

In S120, for detection of a distance between power transmission unit 220 and power receiving unit 110 based on the power transmission efficiency, vehicle ECU 300 closes a relay of voltage detection unit 181 to connect a resistor for a distance detection, and opens CHR 185.

Then, in S130, vehicle ECU 300 outputs a command for starting a test power transmission for a distance detection with respect to power transmission device 200.

In response to this, power transmission ECU 240 starts a test power transmission with use of power which is lower than the transmitted power provided in the case of charging power storage device 190 (S320).

In S140, vehicle ECU 300 receives power of the test power transmission from power transmission device 200 during the parking operation, and detects a voltage VC across the distance detection resistor of voltage detection unit 181.

Then, in S150, vehicle ECU 300 uses the map indicated in FIG. 10 to determine whether or not voltage VC exceeds a threshold value α defining an allowable displacement amount during the stopped state.

In the case where voltage VC is less than or equal to threshold value α (NO in S150), vehicle ECU 300 determines that vehicle 100 has not arrived at a position of performing the power transmission for charging of the charging device, returns the process to S140, and continues the parking operation while detecting voltage VC.

When voltage VC exceeds threshold value α (YES in S150), the process proceeds to S150, and vehicle ECU 300 in S160 gives a notification to a user as to a guidance for prompting stopping of the vehicle. In the case where the parking operation is automatically performed with use of an automatic parking function, the parking operation is stopped in this S150.

Then, vehicle ECU 300 determines in S170 whether or not the parking operation has been completed. The determination of the completion of the parking operation is performed, for example, based on the case where the shift position is set at a P-range which is a parking position, the case where the parking brake is operated, or the case where the ignition switch is turned off.

In the case where the parking operation has not been completed (NO in S170), the process returns to S160, and the completion of the parking operation by the user is awaited.

In the case where the parking operation has been completed (YES in S170), the process proceeds to S180, and vehicle ECU 300 calculates a positional displacement between power transmission unit 220 and power receiving unit 110 in the horizontal direction from the power transmission efficiency in the stopped state of the vehicle.

In S190, vehicle ECU 300 transmits a command for stopping the test power transmission to power transmission device 200. In response to this, power transmission ECU 240 stops the test power transmission (S330).

After that, in S200, vehicle ECU 300 transmits to power transmission device 200 the information, obtained by calculation, of the positional displacement between power transmission unit 220 and power receiving unit 110 in the horizontal direction.

Based on the positional displacement information from vehicle 100, power transmission ECU 240 adjusts impedance adjusting unit 260 so that the power transmission efficiency at this amount of positional displacement becomes larger (S340). The impedance adjustment in S340 may be performed with use of the predetermined map as shown in FIG. 10, or may be performed by actually adjusting the impedance of impedance adjusting unit 260 and making the adjustment to obtain a maximum power transmission efficiency.

When the detection of the amount of positional displacement in the parking operation is terminated, vehicle ECU 300 opens a relay of voltage detection unit 181 and closes CHR 185 in S210. Then, vehicle ECU 300 outputs in S220 a command of starting a power transmission for charging power storage device 190 to power transmission device 200.

Power transmission ECU 240 starts the power transmission with use of electric power larger than the test power transmission in accordance with the power transmission starting command from vehicle 100 (S350).

Then, in S230, vehicle ECU 300 executes the charging process with use of the received electric power.

By performing the control in accordance with the process described above, in the non-contact power supply system configured to transmit electric power in a non-contact manner from the power transmission device to the vehicle, even when the vehicle height is changed, an alignment of the power receiving unit with respect to the power transmission unit can be readily performed, and lowering of the power transmission efficiency can be suppressed. Moreover, since the power transmission efficiency can be grasped, a prediction of the charging completion time can be performed accurately.

(Modified Example of Vehicle Height Detection)

In FIGS. 1 and 4, the configuration is described in which the vehicle height sensor configured to detect a distance between the power transmission unit and the power receiving unit (the vehicle height) is mounted on the side of the vehicle.

However, the arrangement of the vehicle height sensor is not limited to this, and it may be provided on the side of power transmission device 200.

Figure 12:
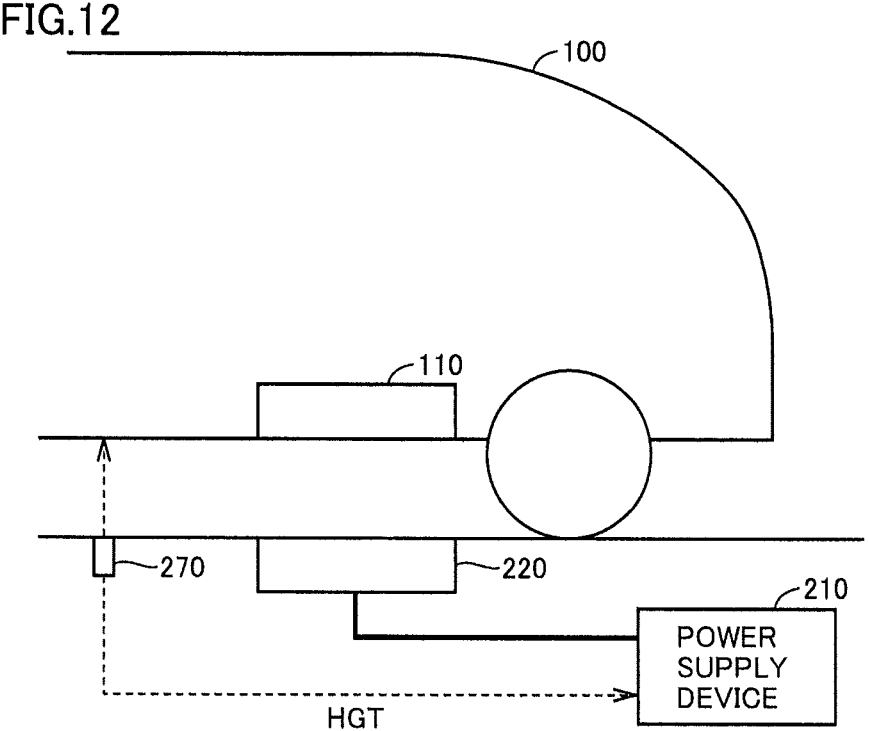
FIG. 12 represents an example of a configuration in which a vehicle height sensor is provided on a side of the power transmission device.

For example, as shown in FIG. 12, a vehicle height sensor 270 may be arranged on the ground to detect a distance with respect to a floor panel of the vehicle provided above. In this case, the detected vehicle height is outputted to power transmission ECU 240 of power transmission device 200.

Figure 13:
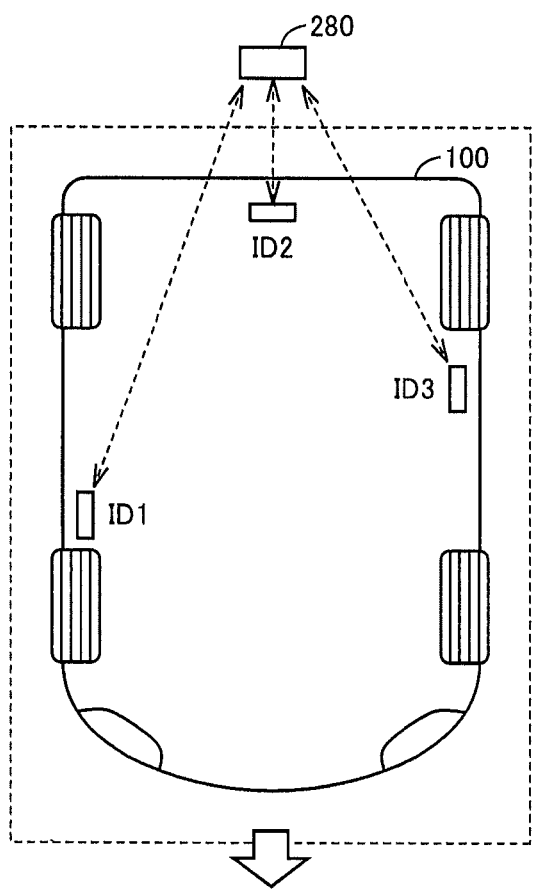
FIG. 13 represents an example of a method for detecting a vehicle height with use of an RFID.

Moreover, as shown in FIG. 13, it is also possible to detect the vehicle height based on a signal from an RFID provided in vehicle 100. In this configuration, signals from at least three RFID tags (ID1 to ID3) provided in vehicle 100 are read by an RFID reader 280 on the side of the power transmission device, and the vehicle height is detected by the principle of triangulation based on the intensities of the read signals. There is a case where such RFID tags are provided to perform pairing between a vehicle and a power transmission device. In that case, the RFID for pairing is used as a vehicle height sensor, so that there would be an advantage that there is no need to provide a vehicle height sensor as an individual sensor. It may be so configured that the RFID reader is provided on the side of the vehicle, and the RFID tag is provided on the side of the power transmission device.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 10, 10A non-contact power supply system; 89 power transmission system; 90, 220, 220A power transmission unit; 91, 110, 110A power receiving unit; 92, 93, 96, 97 coil; 94, 99, 111, 111A, 221, 221A resonance coil; 95, 98, 112, 222, C10, C20, C30, C40 capacitor; 100, 110A vehicle; 113, 223 electromagnetic induction coil; 115 SMR; 118 electrical load device; 120 PCU; 130 motor generator; 140 driving power transmission gear; 150 drive wheel; 155, 270 vehicle height sensor; 160, 230 communication unit; 170, 260A, 261 to 263 matching unit; 170A DC/DC converter; 180 rectifier; 181 voltage detection unit; 185 CHR; 190 power storage device; 195 voltage sensor; 196 current sensor; 200, 200A power transmission device; 210 power supply device; 240 power transmission ECU; 250 power supply unit; 260 impedance adjusting unit; 280 RFID reader; 300 vehicle ECU; 400 commercial power supply; ID1 to ID3 RFID; RY11, RY12, RY21, RY 22, RY31, RY32 relay.

The invention claimed is:

1. A non-contact power supply system configured to supply electric power in a non-contact manner from a power transmission device to a vehicle, the vehicle including a power receiving unit configured to receive electric power in a non-contact manner from the power transmission device, the power transmission device including a power supply unit, a power transmission unit configured to supply electric power in a non-contact manner from the power supply unit to the power receiving unit, and an impedance adjusting unit electrically connected between the power supply unit and the power transmission unit and configured to adjust an impedance between the power supply unit and the power transmission unit, the non-contact power supply system comprising:

a detection unit configured to detect a distance between the power transmission unit and the power receiving unit in a vertical direction; and a control device configured to control the impedance adjusting unit, the control device assisting an alignment between the power transmission unit and the power receiving unit while the vehicle is moving during a parking operation of the vehicle with respect to the power transmission device based on a power transmission efficiency between the power transmission unit and the power receiving unit, and at the time of the alignment, while the vehicle is moving during the parking operation, the control device controlling the impedance adjusting unit based on the distance in the vertical direction detected by the detection unit.

2. The non-contact power supply system according to claim 1, wherein the control device controls the impedance adjusting unit so that, with the distance in the vertical direction, a power receiving characteristic is obtained which causes the power transmission efficiency to be lowered as a positional displacement in a horizontal direction from a predetermined position between the power transmission and the power receiving unit increases.

3. The non-contact power supply system according to claim 2, wherein after the alignment is completed, the control device determines an amount of the positional displacement based on the power transmission efficiency at a stopped position of the vehicle, and further adjusts the impedance adjusting unit based on the determined amount of the positional displacement.

4. The non-contact power supply system according to claim 1, wherein the detection unit is mounted on the vehicle.

5. The non-contact power supply system according to claim 1, wherein the detection unit is included in the power transmission device.

6. The non-contact power supply system according to claim 1, wherein the impedance adjusting unit includes a plurality of matching units set to have impedances different from each other, and the control device selects one of the plurality of matching units in accordance with the distance in the vertical direction.

7. The non-contact power supply system according to claim 1, wherein the impedance adjusting unit has a matching unit having a reactor and a capacitor, at least one of the reactor and the capacitor being a variable element, and the control device adjusts an impedance by changing the variable element of the matching unit in accordance with the distance in the vertical direction.

8. The non-contact power supply system according to claim 1, wherein
the vehicle further includes a power storage device configured to store power received by the power receiving unit, and
at the time of the alignment during the parking operation, the control device allows electric power, which is lower than transmitted power at the time of charging the power storage device, to be transmitted from the power transmission device to the vehicle, and gives a notification of prompting a user to stop the vehicle in response to an event that the power transmission efficiency provided in the case of using the lower power exceeds a predetermined value.

9. The non-contact power supply system according to claim 1, wherein
a difference between a natural frequency of the power transmission unit and a natural frequency of the power receiving unit is less than or equal to ±10% of the natural frequency of the power transmission unit or the natural frequency of the power receiving unit.

10. The non-contact power supply system according to claim 1, wherein
a coupling coefficient between the power transmission unit and the power receiving unit is less than or equal to 0.1.

11. The non-contact power supply system according to claim 1, wherein
the power receiving unit receives electric power from the power transmission unit through at least one of a magnetic field, which is formed between the power receiving unit and the power transmission unit and vibrates at a certain frequency, and an electric field which is formed between the power receiving unit and the power transmission unit and vibrates at a certain frequency.

12. A vehicle configured to receive electric power in a non-contact manner from a power transmission device configured to adjust an impedance by means of an impedance adjusting unit, comprising:
a power receiving unit configured to receive electric power in a non-contact manner from a power transmission unit of the power transmission device; and
a control device configured to control an alignment between the power transmission unit and the power receiving unit while the vehicle is moving during a parking operation with respect to the power transmission device based on a power transmission efficiency between the power transmission unit and the power receiving unit,
at the time of the alignment, while the vehicle is moving in the parking operation, the control device controlling the impedance adjusting unit of the power transmission device based on a distance between the power transmission unit and the power receiving unit in a vertical direction.

13. A power transmission device configured to transmit electric power in a non-contact manner to vehicle, comprising:
a power supply unit;
a power transmission unit configured to supply electric power in a non-contact manner from the power supply unit to a power receiving unit of the vehicle;
an impedance adjusting unit electrically connected between the power supply unit and the power transmission unit and configured to adjust an impedance between the power supply unit and the power transmission unit; and
a control device configured to control the impedance adjusting unit,
the vehicle performing an alignment of the power transmission unit and the power receiving unit while the vehicle is moving during a parking operation with respect to the transmission device based on a power transmission efficiency between the power transmission unit and the power receiving unit, and
at the time of the alignment, while the vehicle is moving during the parking operation, the control device controlling the impedance adjusting unit based on a distance between the power transmission unit and the power receiving unit in a vertical direction.

* * * * *